Patented Nov. 8, 1938

2,136,177

UNITED STATES PATENT OFFICE 2,136,177

UNSATURATED AMINES AND THE PROCESS OF PREPARING THE SAME

Wallace H. Carothers and Gerard J. Berchet, Wilmington, Del., assignors to E. I. du Pont de Nemours & Company, Wilmington, Del., a corporation of Delaware No Drawing. Application March 6, 1937, Serial No. 129,468

15 Claims. (Cl. 260—583)

This invention relates to the preparation of new organic chemical compounds from chloro-4-butadiene-1,2. The invention further relates to 2,3-butadienyl amines and the process of making the same. The invention still further relates to the preparation of amines and related nitrogen compounds containing one or more 2,3-butadienyl radicals ($CH_2=C=CH-CH_2-$).

This case is a continuation-in-part of applicants' copending application Serial No. 640,326, filed October 29, 1932, which has now matured into U. S. Patent No. 2,073,363, issued March 9, 1937.

It has been disclosed in a patent to Carothers and Collins, 1,950,431, patented March 13, 1934, that the reaction between monovinylacetylene and hydrogen chlorine, under certain conditions, yields substantial quantities of chloro-4-butadiene-1,2 ($CH_2=C=CH-CH_2Cl$), a new compound, which may be obtained in pure form by fractional distillation. One method of producing chloro-4-butadiene-1,2 is illustrated in the following example:

EXAMPLE A

In each of 20 bottles were placed 175 g. of concentrated hydrochloric acid, 25 g. of calcium chloride and 50 g. of monovinylacetylene. The bottles were closed and shaken continuously for 5 hours, the supernatant oily layers were drawn off and combined, washed with water, stabilized with pyrogallol, dried with anhydrous calcium chloride, and distilled thru a long column. The fractions collected were: (1) 74 g. at 30–35° C., (2) 222 g. at 50–75° C., (3) 576 g. at 80–95° C., (4) 77 g. at 95–120° C., and (5) 125 g. residue. Fraction (3) was chiefly chloro-4-butadiene-1,2. On redistillation it yielded 446 g. of pure product. This compound has a boiling point of 86–88° C., a refractive index of about 1.477 at 20° C. and specific gravity of about 0.991 at 20° C.

It has now been found that this compound contains its chlorine atoms in rather loose combination and hence is capable of undergoing many reactions in which chlorine is replaced by other groups with the formation of new and valuable compounds.

One object of the invention pertains to the preparation of novel derivatives of butadiene-1,2. A further object relates to amines and related compounds containing one or more 2,3-butadienyl radicals and the process of preparing the same. Further objects will appear hereinafter.

These objects are accomplished by reacting chloro-4-butadiene-1,2 with compounds of the group consisting of ammonia, ammonium hydroxide, primary, secondary and tertiary aliphatic amines, primary aromatic amines, secondary mixed aliphatic and aromatic amines, tertiary mixed amines having two aliphatic groups and one aromatic group, and secondary and tertiary heterocyclic amines. Chloro-4-butadiene-1,2 readily reacts with the above amines and ammonia to form 2,3-butadienyl amines (amino-4-butadienes-1,2). This reaction is illustrated in the following examples. It is to be understood that the methods of preparation can be varied over wide limits and the examples recorded below are merely by way of illustration.

EXAMPLE 1

*Amino-4-butadiene-1,2*

Fifty grams of chloro-4-butadiene-1,2 and 125 cc. of liquid ammonia are allowed to react for 24 hours at room tempertaure in a closed container. After evaporation of the unused ammonia the residue is distilled under reduced pressure. The fraction boiling at 37–38° C. at 40 mm. is the primary amine. It is a liquid of strong ammoniacal odor, soluble in water to give an alkaline solution. Its refractive index is 1.4290. On treatment with alpha naphthyl isocyanate it gives alpha-N-naphthyl - N' - 2,3 - butadienyl-1-urea

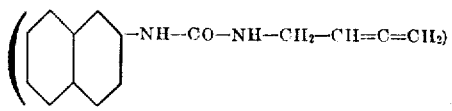

a crystalline compound melting at 77° C. On hydrogenation the amine gives n-butylamine. Small amounts of di- and tri- (2,3-butadienyl) amines are formed along with the primary amine in the above reaction with liquid ammonia. They remain in the residues from the purification of the primary amine and may, if desired, be separated and purified by fractional distillation.

The liquid ammonia is preferably used in excess in order to obtain high yields of amine.

EXAMPLE 2

*Di(2,3-butadienyl) amine and tri(2,3-butadienyl) amine*

The secondary and tertiary amines may be prepared in higher yield as follows: Chloro-4-butadiene-1,2 is shaken with an excess of concentrated ammonium hydroxide for 24 hours. The insoluble oily layer is separated, united with the material obtained by ether extraction of the water layer and finally dried and fractionally distilled at 1.5 mm. pressure. The material distilling at 56–58° C. is the secondary amine and that at 85–90° is the tertiary amine.

The secondary amine is obtained in pure form by another fractional distillation. It boils at 48° C. at 0.1 mm. pressure, has a density of 0.8783 and a refractive index of 1.5168. On hydrogenation by means of a platinum catalyst it gives n-dibutylamine. The di(2,3-butadienyl) amine reacts with phenyl isocyanate to give phenyl di(2,3-butadienyl) urea, a crystalline compound which melts at 91° C. after recrystallization from ligroin.

The tertiary amine may likewise be purified by another distillation. It boils at 81° C. at 0.1 mm. pressure, and has a density of 0.8934 and a refractive index of 1.5320. It reacts with methyl iodide to give tri(2,3-butadienyl) methyl-ammonium iodide, a crystalline compound melting at 111° C.

EXAMPLE 3

*Mono(2,3-butadienyl) aniline and di(2,3-butadienyl) aniline*

Fifty grams of chloro-4-butadiene-1,2 and sixty grams of aniline are allowed to react at 30° C. for 24 hours. The crystalline mass thus obtained is treated with dilute alkali and the oil which separates is washed with dilute acetic acid, dried and distilled. The secondary amine distills over in the neighborhood of 90–95° C. and the tertiary amine in the neighborhood of 120° C., both at 1 mm. pressure.

The mono(2,3-butadienyl) aniline thus obtained when further purified by distillation boils at 92–94° C. at 1 mm. pressure, and has a density of 0.9960 and a refractive index of 1.5890. It reacts with toluene sulfonyl chloride to give butadienyl phenyl toluene sulfone amide, a crystalline compound melting at 83° C. It may also be hydrogenated by means of a platinum catalyst giving n-butylaniline.

The tertiary amine di(2,3-butadienyl) aniline may be purified by another distillation. It then has a boiling point of 120° C. at 1 mm. pressure, a density of 0.9873 and a refractive index of 1.5948.

The refractive indices given for the above compounds are determined at 20° C. for the yellow line of the sodium spectrum. Likewise, the densities are determined at 20° C.

From the above examples it will be seen that a general method has been disclosed for the preparation of primary, secondary, and tertiary amines containing one or more 2,3-butadienyl radicals $CH_2=C=CH—CH_2—$. The other radicals attached to the nitrogen atom may be either aliphatic or aromatic according to the type of amine used to react with the chloro-4-butadiene-1,2. Thus, aliphatic secondary and tertiary amines of butadiene may be prepared by using in lieu of aniline in Example 3, methyl and dimethylamine, ethyl- and diethylamine, or any of the corresponding higher aliphatic amines. We prefer, however, those amines having from one to eighteen carbon atoms in the aliphatic radicals; i. e., amines ranging from methyl to stearylamine. Substituted amines such as ethanolamine may be used. In fact, any substituted amine may be used, but if the amine contains another group which also reacts with the chlorine of the chloro-4-butadiene-1,2, then it may be necessary to employ a larger proportion of the chloro-4-butadiene-1,2. We prefer to use hydrocarbon amines; i. e., amines in which the organic radicals attached to the nitrogen contain only carbon and hydrogen. More especially we prefer saturated hydrocarbon amines; although unsaturated amines, such as allylamine may be used. When unsaturated compounds are used, there is a tendency for polymerization to occur, and this may be diminished by the use of polymerization inhibitors. Other aromatic amines which may be used in the process of Example 3 in lieu of aniline are toluidine, anisidine, naphthylamine, cumidine and the like. Mixed amines such as N-methyl aniline may be used. Heterocyclic secondary amines such as piperidine may likewise be used.

The reacting amine may be used as such with or without solvents. Likewise, as illustrated in the above examples, the reaction may be carried out at elevated or room temperatures. Temperatures below room temperature may also be used.

The proportion of reactants may be varied over wide ranges. However, the percentage yield will be dependent upon the proportions used. Thus, in Example 1, a decrease in the proportion of ammonia will cause an increase in the relative amounts of di and tri (2,3-butadienyl) amines formed and a decrease in the relative amount of the primary 2,3-butadienyl amine.

The 2,3-butadienylamines are all new compounds, never before described in the literature. They may be used as indicated in the above examples for the synthesis of other new organic compounds through reactions involving either the double bonds of the butadienyl group or the nitrogen atom. Butadienylamines may also be used for a variety of purposes for which other organic amines are used, such as the manufacture of dyestuffs and pharmaceutical chemicals and for the inhibition of the oxidation of readily oxidized substances such as rubber and naturally occurring unsaturated fatty oils.

Chloro-4-butadiene-1,2 may also be reacted with tertiary amines to produce quaternary ammonium salts containing one or more butadienyl radicals. Thus, one mole of trimethylamine is dissolved in benzene and one mole of chloro-4-butadiene-1,2 is added. The mixture is allowed to stand for about 12 hours, and is then filtered. The residue on the funnel is a crystalline mass of 2,3-butadienyl-trimethylammonium chloride $(CH_2=C=CH—CH_2—N(CH_3)_3Cl)$. The yield is practically quantitative. The compound melts at about 200° C. It dissolves readily in water and when its aqueous solution is treated with cold caustic alkali a smooth reaction occurs with the liberation of vinylacetylene and trimethylamine. Pyridine, dimethylaniline, etc. may be used in place of the trimethylamine of the above example.

In addition to the use of chloro-4-butadiene-1,2 in the reactions described above, the invention is intended to include also the use of other halogen-4-butadienes-1,2; e. g., bromo-4-butadiene-1,2.

The above description and examples are intended to be construed as illustrative only. Any modification or variation thereof which conforms to the spirit of the invention is intended to be included within the scope of the claims.

We claim:

1. The process which comprises reacting halogen-4-butadiene-1,2 with a nitrogen compound of the group consisting of ammonia, ammonium hydroxide, primary aliphatic amines, secondary aliphatic amines, tertiary aliphatic amines, primary aromatic amines, secondary amines having one aliphatic and one aromatic group attached to the nitrogen atom, tertiary amines having two aliphatic groups and one aromatic group attached to the nitrogen atom, secondary heterocyclic amines and tertiary heterocyclic amines.

2. The process which comprises reacting chloro-4-butadiene-1,2 with a nitrogen compound of the group consisting of ammonia, ammonium hydroxide, primary aliphatic amines, secondary aliphatic amines, tertiary aliphatic amines, primary aromatic amines, secondary amines having one aliphatic and one aromatic group attached to the nitrogen atom, tertiary amines having two aliphatic groups and one aromatic group attached to the nitrogen atom, secondary heterocyclic amines and tertiary heterocyclic amines.

3. The process which comprises reacting chloro-4-butadiene-1,2 with ammonia.

4. The process which comprises reacting chloro-4-butadiene-1,2 with an aliphatic amine.

5. The process which comprises reacting chloro-4-butadiene-1,2 with a hydrocarbon aliphatic amine.

6. The process which comprises reacting chloro-4-butadiene-1,2 with a primary amine.

7. The process which comprises reacting chloro-4-butadiene-1,2 with a hydrocarbon primary amine.

8. The process which comprises reacting chloro-4-butadiene-1,2 with a hydrocarbon aliphatic primary amine.

9. The process which comprises reacting chloro-4-butadiene-1,2 with a hydrocarbon aromatic primary amine.

10. A butadienyl compound obtainable by the process of claim 2.

11. A compound having the general formula

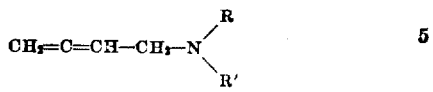

wherein R is a member of the group consisting of hydrogen and aliphatic hydrocarbon radicals and R' is a member of the group consisting of hydrogen and hydrocarbon radicals.

12. A compound having the formula

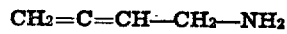

13. A compound having the general formula

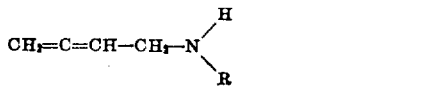

wherein R is a member of the group consisting of hydrogen and hydrocarbon radicals.

14. The process which comprises reacting chloro-4-butadiene-1,2 with ammonia in the absence of water.

15. A compound having the general formula

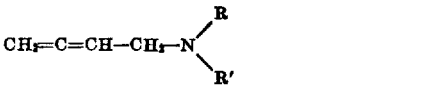

wherein R is a member of the group consisting of hydrogen and the radical $CH_2=C=CH-CH_2-$ and R' is a member of the group consisting of hydrogen and the radical $CH_2=C=CH-CH_2-$.

WALLACE H. CAROTHERS.
GERARD J. BERCHET.